US011979706B2

(12) United States Patent
Yao et al.

(10) Patent No.: US 11,979,706 B2
(45) Date of Patent: May 7, 2024

(54) NECKBAND EARPHONE AND FUNCTION SWITCHING METHOD, SYSTEM AND DEVICE, AND COMPUTER MEDIUM

(71) Applicant: GOERTEK INC., Shandong (CN)

(72) Inventors: Zengkai Yao, Shandong (CN); Kun Song, Shandong (CN)

(73) Assignee: GOERTEK INC., Shandong (CN)

(*) Notice: Subject to any disclaimer, the term of this patent is extended or adjusted under 35 U.S.C. 154(b) by 213 days.

(21) Appl. No.: 17/624,024

(22) PCT Filed: Dec. 31, 2019

(86) PCT No.: PCT/CN2019/130330
§ 371 (c)(1),
(2) Date: Dec. 30, 2021

(87) PCT Pub. No.: WO2021/120331
PCT Pub. Date: Jun. 24, 2021

(65) Prior Publication Data
US 2022/0360879 A1 Nov. 10, 2022

(30) Foreign Application Priority Data
Dec. 20, 2019 (CN) ........................ 201911326707.0

(51) Int. Cl.
*H04R 1/10* (2006.01)

(52) U.S. Cl.
CPC ......... *H04R 1/1041* (2013.01); *H04R 1/1016* (2013.01); *H04R 1/105* (2013.01); *H04R 1/1066* (2013.01)

(58) Field of Classification Search
CPC .... H04R 1/1041; H04R 1/1016; H04R 1/105; H04R 1/1066
See application file for complete search history.

(56) References Cited

U.S. PATENT DOCUMENTS 9,883,278 B1 1/2018 Lin et al.
11,368,775 B1 * 6/2022 Prelogar ............ H02J 7/00034
(Continued)

FOREIGN PATENT DOCUMENTS

CN 201159882 12/2008
CN 101404688 4/2009
(Continued)

OTHER PUBLICATIONS

International Search Report issued in PCT/CN2019/130330 dated Sep. 25, 2020.

*Primary Examiner* — Jason R Kurr
(74) *Attorney, Agent, or Firm* — HAUPTMAN HAM, LLP

(57) ABSTRACT

A neckband earphone is provided, and a method, a system and a device for switching functions of the neckband earphone are provided. A key is provided on each of a left portion and a right portion of a neckband of the neckband earphone. The neckband is provided with a detector and a processor connected with the detector. The detector is configured to detect and determine a wearing orientation of the neckband earphone. The processor is configured to determine a function of the key on the left portion and a function of the key on the right portion based on the wearing orientation, to control key functions on a left side and a right side of a human body wearing the neckband earphone to remain unchanged for different wearing orientations.

4 Claims, 7 Drawing Sheets

(56) References Cited

U.S. PATENT DOCUMENTS

| | | | | |
|---|---|---|---|---|
| 2013/0279724 | A1 | 10/2013 | Stafford et al. | |
| 2014/0079238 | A1* | 3/2014 | Bastide | H04R 5/033 381/74 |
| 2014/0233752 | A1 | 8/2014 | Seo et al. | |
| 2016/0073200 | A1* | 3/2016 | Yoo | H04R 1/10 381/311 |
| 2016/0205459 | A1* | 7/2016 | Kamada | H04R 1/1041 381/74 |
| 2016/0210111 | A1* | 7/2016 | Kraft | G06F 3/165 |
| 2018/0063620 | A1* | 3/2018 | Kim | H04R 1/1025 |
| 2019/0238969 | A1* | 8/2019 | Koike | G06V 40/1365 |
| 2019/0306613 | A1* | 10/2019 | Qian | H04R 5/04 |
| 2021/0168489 | A1* | 6/2021 | Zhang | H04R 1/1091 |

FOREIGN PATENT DOCUMENTS

| | | |
|---|---|---|
| CN | 202050449 | 11/2011 |
| CN | 104010241 | 8/2014 |
| CN | 104509129 | 4/2015 |
| CN | 105681946 | 6/2016 |
| CN | 205622803 | 10/2016 |
| CN | 106358127 | 1/2017 |
| CN | 108153432 | 6/2018 |
| CN | 207753830 | 8/2018 |
| CN | 109195058 | 1/2019 |
| CN | 208540121 | 2/2019 |
| CN | 209134604 | 7/2019 |

* cited by examiner

NECKBAND EARPHONE AND FUNCTION SWITCHING METHOD, SYSTEM AND DEVICE, AND COMPUTER MEDIUM

This application is a 371 Application of International Patent Application No. PCT/CN2019/130330, titled "NECKBAND EARPHONE AND FUNCTION SWITCHING METHOD, SYSTEM AND DEVICE, AND COMPUTER MEDIUM", filed on Dec. 31, 2019, which claims the benefit of and priority to Chinese Patent Application No. 201911326707.0 titled "NECKBAND EARPHONE AND FUNCTION SWITCHING METHOD, SYSTEM AND DEVICE, AND COMPUTER MEDIUM", filed on Dec. 20, 2019 with the China National Intellectual Property Administration (CNIPA), both of which are incorporated herein by reference in their entireties.

FIELD

The present disclosure relates to the technical field of earphones, and in particular to a neckband earphone, a method, a system and a device for switching functions of a neckband earphone, and a computer storage medium.

BACKGROUND

In an existing neckband earphone, in order to improve the user experience of wearing the neckband earphone, the left and right earbuds of the neckband earphone may be designed to be fitted to human ears, which however limits the wearing process of the neckband earphone. For example, the user has to wear the left earbud of the neckband earphone on only the left ear, which requires the user to determine a wearing orientation for wearing the neckband earphone, resulting in a poor experience for the user.

In summary, it is desired to solve the problem that the user has to determine the wearing orientation of the neckband earphone.

SUMMARY

A neckband earphone is provided according to the present disclosure, which can solve the technical problem that the user has to distinguish the wearing orientation of the neckband earphone. A method, a system and a device for switching functions of a neckband earphone, and a computer-readable storage medium are further provided according to the present disclosure.

In order to achieve the above objective, the following technical solutions are provided according to present disclosure.

A neckband earphone is provided. A key is provided on each of a left portion and a right portion of a neckband of the neckband earphone. The neckband is provided with a detector and a processor connected with the detector. The detector is configured to detect and determine a wearing orientation of the neckband earphone. The processor is configured to determine a function of the key on the left portion and a function of the key on the right portion based on the wearing orientation, to control key functions on a left side and a right side of a human body wearing the neckband earphone to remain unchanged for different wearing orientations.

In an embodiment, the detector includes a gravity sensor and a microprocessor connected with the gravity sensor. The gravity sensor is configured to detect an acceleration direction in a process of wearing the neckband earphone. The microprocessor is configured to determine the wearing orientation of the neckband earphone based on the acceleration direction.

In an embodiment, the detector includes a pressure sensor and a microprocessor connected with the pressure sensor. The pressure sensor is arranged in the neckband and close to a surface of the neckband. The microprocessor is configured to determine the wearing orientation of the neckband earphone by comparing, after the neckband earphone is worn, a pressure detected by the pressure sensor with a threshold stored in the pressure sensor.

In an embodiment, the neckband is bilaterally symmetric and vertically symmetric. A position of the key on the left portion of the neckband is bilaterally symmetric and vertically symmetric to a position of the key on the right portion of the neckband. Earbud outlet holes of the neckband earphone are arranged on front ends of the neckband and are each vertically symmetric. A left earbud of the neckband earphone and a right earbud of the neckband earphone have the same shape and the same size.

In an embodiment, the key is a touch key or a mechanical key.

In an embodiment, the neckband earphone further includes a sensor connected with the processor. The sensor includes an infrared sensor for wearing detection. The sensor is arranged on a side of the neckband that is close to a neck.

In an embodiment, the sensor further includes a sensor shield. The sensor shield is fixed on the neckband. The infrared sensor is arranged on a side of the sensor shield facing the neckband.

In an embodiment, a method for switching functions of a neckband earphone is applied to the neckband earphone. The method includes: detecting and determining a wearing orientation of the neckband earphone; and determining the function of the key on the left portion of the neckband earphone and the function of the key on the right portion of the neckband earphone based on the wearing orientation, to control key functions on the left side and the right side of the human body wearing the neckband earphone to remain unchanged for different wearing orientations.

In an embodiment, the determining the function of the key on the left portion and the function of the key on the right portion based on the wearing orientation includes: determining whether the wearing orientation is the same as a predetermined orientation; keeping, if the wearing orientation is the same as the predetermined orientation, the function of the key on the left portion and the function of the key on the right portion the same as predetermined functions; and interchanging, if the wearing orientation is opposite to the predetermined orientation, the function of the key on the left portion with the function of the key on the right portion.

A system for switching functions of a neckband earphone is applied to the neckband earphone. The system includes a first detection module and a first determination module. The first detection module is configured to detect and determine the wearing orientation of the neckband earphone. The first determination module is configured to determine the function of the key on the left portion of the neckband earphone and the function of the key on the right portion of the neckband earphone based on the wearing orientation, to control key functions on the left side and the right side of the human body wearing the neckband earphone to remain unchanged for different wearing orientations.

A device for switching functions of a neckband earphone is applied to the neckband earphone. The device includes a memory and a processor. The memory is configured to store a computer program. The processor is configured to, when executing the computer program, perform the method for switching functions of a neckband earphone described above.

A computer-readable storage medium is applied to the neckband earphone. The computer-readable storage medium stores a computer program. The computer program is used to, when being executed by a processor, perform the method for switching functions of a neckband earphone described above.

In the neckband earphone according to the present disclosure, a key is provided on each of a left portion and a right portion of a neckband of the neckband earphone. The neckband is provided with a detector and a processor connected with the detector. The detector is configured to detect and determine a wearing orientation of the neckband earphone. The processor is configured to determine a function of the key on the left portion and a function of the key on the right portion based on the wearing orientation, to control key functions on a left side and a right side of a human body wearing the neckband earphone to remain unchanged for different wearing orientations. In the neckband earphone according to the present disclosure, the key is provided on each of the left portion and the right portion of a neckband of the neckband earphone. The neckband of the neckband earphone is provided with the detector connected with the processor. Moreover, the wearing orientation of the neckband earphone is detected by the detector, and a function of the key on the left portion and a function of the key on the right portion are determined by the processor, to control key functions on a left side and a right side of a human body wearing the neckband earphone to remain unchanged for different wearing orientations. Therefore, no matter whether the user wears the neckband earphone in a predefined orientation or in a reverse orientation, the key functions of the neckband earphone on the left side and the right side of the human body remain unchanged, so that the user does not need to determine the wearing orientation of the neckband earphone. The method, the system and the device for switching functions of a neckband earphone and the computer-readable storage medium according to the present disclosure also solve the same technical problem.

BRIEF DESCRIPTION OF THE DINITIALINGS

In order to more clearly illustrate technical solutions in embodiments of the present disclosure or the conventional technology, the drawings to be used in the embodiments or the conventional technology are briefly described below. Apparently, the drawings in the following description show only some embodiments of the present disclosure, and other drawings may be obtained by those skilled in the art from the drawings without any creative work.

DETAILED DESCRIPTION OF EMBODIMENTS

The technical solutions in the embodiments of the present disclosure are described in conjunction with the drawings in the embodiments of the present disclosure hereinafter. It is apparent that the described embodiments are only some embodiments of the present disclosure, rather than all embodiments. All other embodiments obtained by those skilled in the art based on the embodiments of the present disclosure without any creative work fall within the protection scope of the present disclosure.

Figure 1:
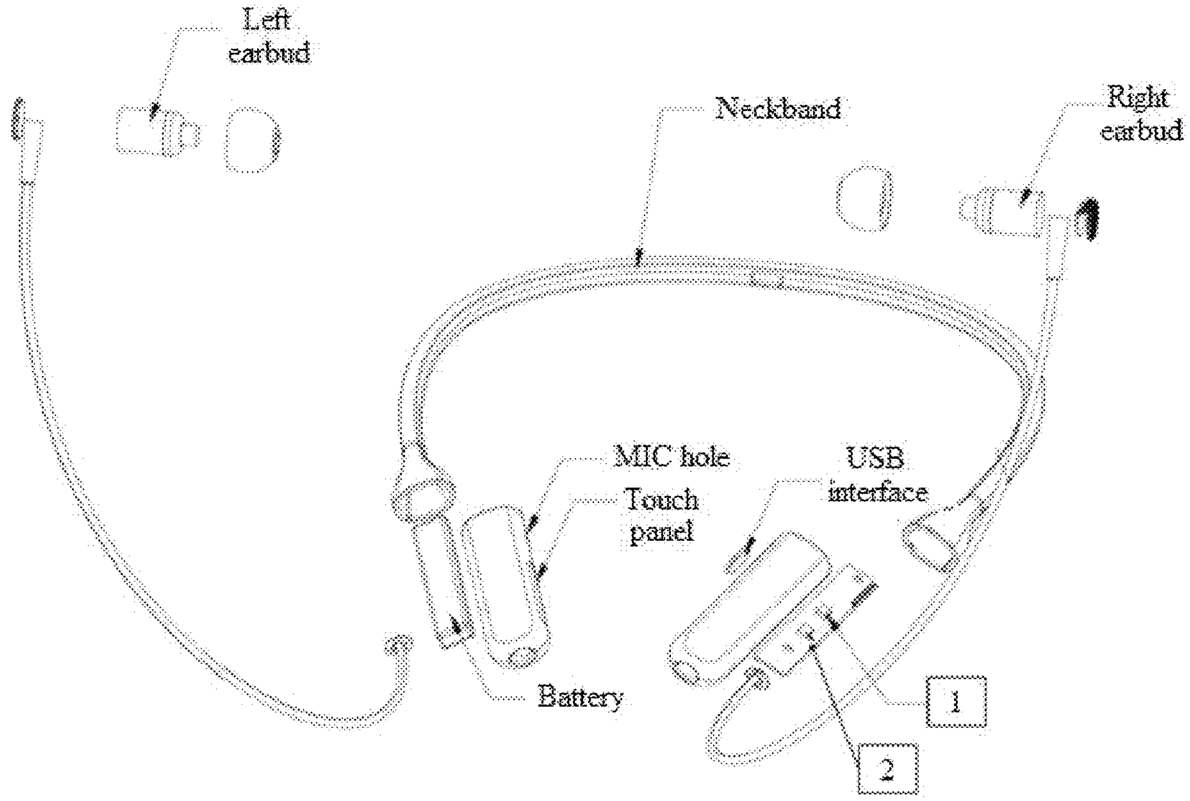
FIG. 1 is a schematic structural diagram of a neckband earphone according to an embodiment of the present disclosure.

Reference is made to FIG. 1, which is a schematic structural diagram of a neckband earphone according to an embodiment of the present disclosure.

A neckband earphone is provided according to an embodiment of the present disclosure. A key is provided on each of a left portion and a right portion of a neckband of the neckband earphone. The neckband is provided with a detector 1 and a processor 2 connected with the detector 1. The detector 1 is configured to detect and determine a wearing orientation of the neckband earphone. The processor 2 is configured to determine a function of the key on the left portion and a function of the key on the right portion based on the wearing orientation, to control key functions on a left side and a right side of a human body wearing the neckband earphone to remain unchanged for different wearing orientations.

In practices, positions of the detector and the processor on the neckband earphone may be determined according to the actual requirements. Positions of the keys on the left portion and the right portion of the neckband of the neckband earphone may also be determined according to the actual requirements.

It should be noted that in the conventional technology, the key is provided on only one portion of the neckband earphone, and thus the user is required to determine the wearing orientation of the neckband earphone according to the preference of the user on the key when wearing the neckband earphone. For example, the key of the neckband earphone is arranged on a left portion of the neckband. If the user likes to operate the neckband earphone with the left hand, the user is required to ensure that the key of the neckband earphone, when being worn, is on the left side of the user. If the user likes to operate the neckband earphone with the right hand, the user is required to ensure that the key of the neckband earphone is worn on the right side of the user. Therefore, the user is required to determine and adjust the wearing orientation of the neckband earphone. In the present disclosure, the key is provided on each of the left portion and the right portion of the neckband earphone. Moreover, after the neckband earphone is worn, the functions of the keys worn on the left and right sides of the human body are controlled, by the detector and the processor, to remain unchanged for different wearing orientations, so that a function on each side of the human body can be unchanged without requiring the user to adjust the wearing orientation of the neckband earphone.

It should be noted that the neckband earphone according to the present disclosure may further include the same devices as the neckband earphone according to the conventional technology, such as a power supply. Arrangement of the devices in the neckband earphone may be determined according to the actual requirements, which are not specifically limited in the present disclosure.

In the neckband earphone according to the present disclosure, a key is provided on each of a left portion and a right portion of a neckband of the neckband earphone. The neckband is provided with a detector and a processor connected with the detector. The detector is configured to detect and determine a wearing orientation of the neckband earphone. The processor is configured to determine a function of the key on the left portion and a function of the key on the right portion based on the wearing orientation, to control key functions on a left side and a right side of a human body wearing the neckband earphone to remain unchanged for different wearing orientations. In the neckband earphone according to the present disclosure, both right and left portions of the neckband of the neckband earphone are provided with keys. The neckband of the neckband earphone is provided with the detector connected with the processor. Moreover, the wearing orientation of the neckband earphone is detected by the detector, and the functions of the keys on the left portion and the right portion are determined by the processor based on the wearing orientation, to control key functions on a left side and a right side of the human body wearing the neckband earphone to remain unchanged for different wearing orientations. Therefore, no matter whether the user wears the neckband earphone in a predefined orientation or in a reverse orientation, the key functions of the neckband earphone on the left side and the right side of the human body remain unchanged, so that the user does not need to determine the wearing orientation of the neckband earphone.

In a neckband earphone according to an embodiment of the present disclosure, since a gravity sensor can detect the direction, the wearing orientation of the neckband earphone may be acquired by using the gravity sensor. That is, the detector in the present disclosure may be embodied as a gravity sensor and a microprocessor connected with the gravity sensor. The gravity sensor is configured to detect an acceleration direction in a process of wearing the neckband earphone. The microprocessor is configured to determine the wearing orientation of the neckband earphone based on the acceleration direction. For example, it may be predetermined that the neckband earphone is worn in the predefined orientation in a case that the acceleration direction detected by the gravity sensor is upward. Therefore, it is determined that the neckband earphone is worn in the reverse orientation in a case that the microprocessor determines that the acceleration direction detected by the gravity sensor is downward. In such case, the processor may interchange the function of the key on the left portion with the function of the key on the right portion, so as to ensure that, on the same side of the human body, the key function in the case that the neckband earphone is worn in the reverse orientation, is the same as the key function in the case that the neckband earphone is worn in the predefined orientation. Accordingly, in a case that the microprocessor determines that the acceleration direction detected by the gravity sensor is downward, it is determined that the neckband earphone is worn in the predefined orientation.

The position of the gravity sensor arranged on the neckband earphone may be determined according to the actual requirements, which is not limited in the present disclosure.

In a neckband earphone according to an embodiment of the present disclosure, the wearing orientation of the neckband earphone may be determined based on a pressure on a component in the neckband earphone. When the user wears the neckband earphone in different manners, pressure conditions between the neckband earphone and the user are different. It is assumed that a lower surface of the neckband earphone is in contact with the user when the user wears the neckband earphone in the predefined orientation. In such case, the lower surface of the neckband earphone is pressed. While an upper surface of the neckband earphone is in contact with the user when the user wears the neckband earphone in the reverse orientation. In such case, the upper surface of the neckband earphone is pressed. Therefore, in the neckband earphone according to the present disclosure, the detector may include a pressure sensor and a microprocessor connected with the pressure sensor. The pressure sensor may be arranged in the neckband and close to a surface of the neckband. The surface may be on a side of the neckband that is close to or away from a shoulder, rather than a neck, when the neckband earphone is worn. In addition, the pressure sensor cannot be moved after being arranged on the neckband. That is, it is required to determine the surface of the neckband according to the wearing orientation of the neckband earphone only once when the pressure sensor is arranged. For example, in the case that the neckband earphone is worn in the predefined orientation, the pressure sensor is arranged in the neckband and on the side that is close to the shoulder, and cannot be moved. When the neckband earphone is worn in the reverse orientation, the pressure sensor is on the side that is away from the shoulder of the human body. The microprocessor is configured to determine the wearing orientation of the neckband earphone by comparing a pressure detected by the pressure sensor with a threshold stored in the pressure sensor after the neckband earphone is worn. In addition, in a case that the neckband earphone is worn in different orientations, data collected by the pressure sensor are different.

In practices, after the position of the pressure sensor arranged on the neckband earphone is determined, a relationship between the measurement of the pressure sensor and the wearing orientation of the neckband earphone may be tested and recorded. For example, in a case that the neckband earphone is worn in the predefined orientation, values acquired by the pressure sensor are less than a first threshold, and in a case that the neckband earphone is worn in the reverse orientation, the values acquired by the pressure sensor are less than a second threshold. Therefore, in a case that the microprocessor determines that the value acquired in real time by the pressure sensor is less than the first threshold, it is determined that the neckband earphone is worn in the predefined orientation. Accordingly, in a case that it is determined that the value acquired in real time by the pressure sensor is less than the first threshold, it is determined that the neckband earphone is worn in the reverse orientation. In such case, the processor may interchange the functions of the keys on the right and left portions of the neckband earphone, so as to ensure that, on the same side of the human body, the key function in the case that the neckband earphone is worn in the reverse orientation, is the same as the key function in the case that the neckband earphone is worn in the predefined orientation.

In a specific application scenario, the data collected by the pressure sensor may be simply classified as pressure absent and pressure presence, which are used to indicate different wearing orientations of the neckband earphone. It should be noted that the position of the pressure sensor in the neckband earphone may be determined according to the actual requirements.

Figure 2:
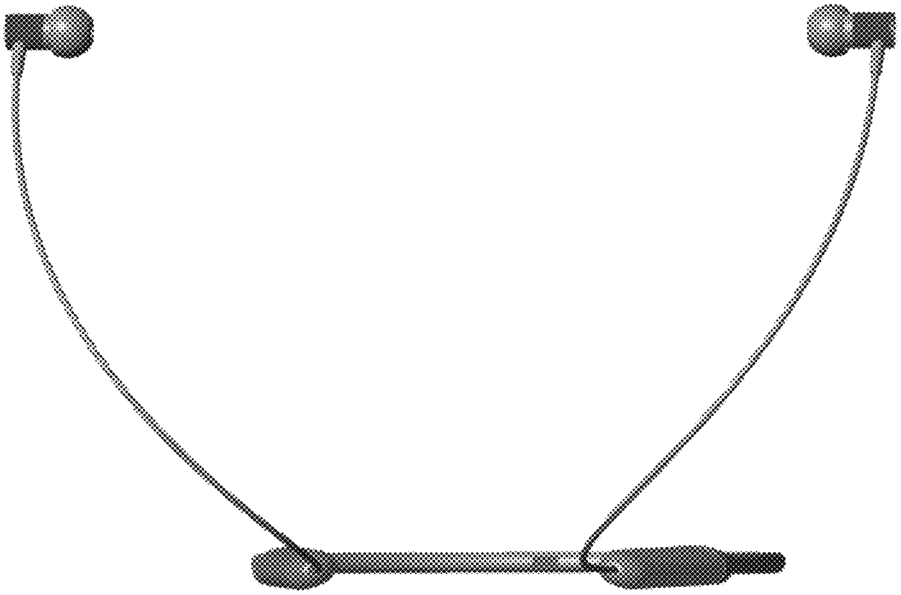
FIG. 2 is a schematic diagram showing an appearance of a neckband earphone according to an embodiment of the present disclosure.

Reference is made to FIG. 1 and FIG. 2. FIG. 2 is a schematic diagram showing an appearance of a neckband earphone according to an embodiment of the present disclosure.

The structure of the neckband earphone affects experiences of the user wearing the neckband earphone in the predefined orientation and the reverse orientation. Therefore, in order to better eliminate the impact of the structure of the neckband earphone on the experiences of the user wearing the neckband earphone, the neckband earphone according to an embodiment of the present disclosure may be designed as follows. The neckband is bilaterally symmetric and vertically symmetric. A position of the key on the left portion is bilaterally symmetric and vertically symmetric to a position of the key on the right portion. Earbud outlet holes of the neckband earphone are arranged on front ends of the neckband and are each vertically symmetric. A left earbud of the neckband earphone and a right earbud of the neckband earphone have the same shape and the same size. In this way, no matter whether the user wears the neckband earphone in the predefined orientation or in the reverse orientation, no difference can be intuitively felt, so that it is unnecessary for the user to pay attention to the wearing orientation of the neckband earphone, thereby better improving the experience for the user wearing the neckband earphone.

In a neckband earphone according to an embodiment of the present disclosure, in order to reduce the number of openings of the neckband earphone to improve a dust-proof function and a waterproof function of the neckband earphone, a touch panel may be arranged on each of the left portion and the right portion of the neckband. Accordingly, the keys of the neckband earphone are touch keys. Alternatively, the keys of the neckband earphone may be mechanical keys.

Figure 3:
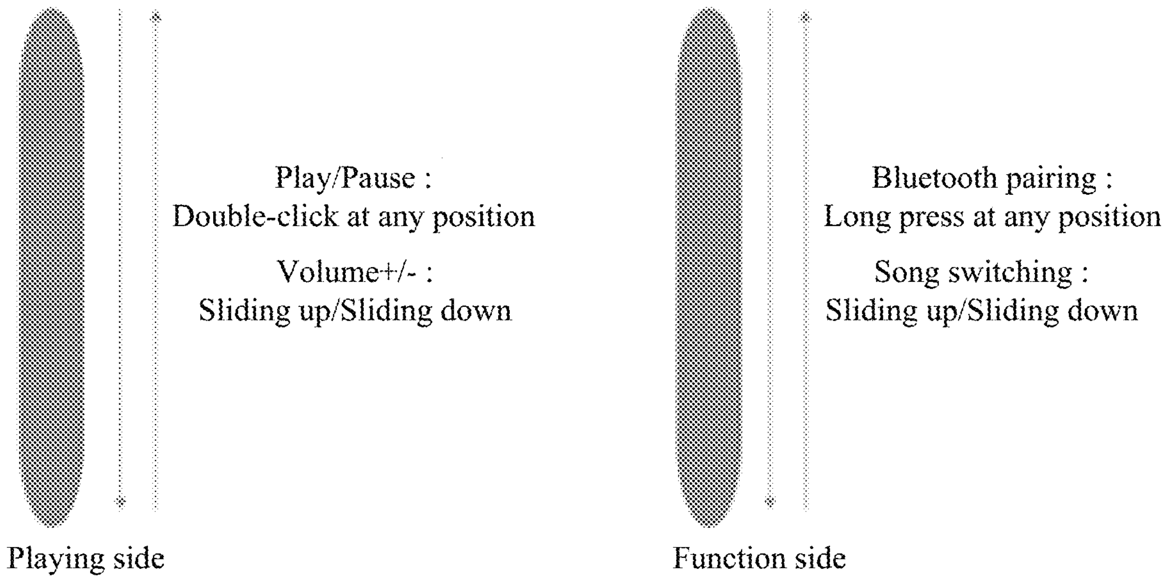
FIG. 3 is a diagram showing definitions of gestures on touch panels.

In practices, controls of a playing side and a function side may be respectively implemented by the two touch panels. Touch gestures defined on the two touch panels may be as shown in FIG. 3. Specifically, on the playing side, a play-pause function may be implemented by double-click at any position, and a function of increase-decrease of volume may be implemented by sliding up or sliding down. On the function side, a Bluetooth pairing function may be implemented by a long press at any position, and a song switching function may be implemented by sliding up or sliding down. If it is defined that the key function on the left side of the human body corresponds to the playing side and the key function on the right side of the human body corresponds to the function side, the correspondences remains unchanged no matter whether the neckband earphone is worn in the predefined orientation or in the reverse orientation. If it is defined that the key function on the left side of the human body corresponds to the function side and the key function on the right side of the human body corresponds to the playing side, the correspondences remains unchanged no matter whether the neckband earphone is worn in the predefined orientation or in the reverse orientation.

In practices, a USB interface of the neckband earphone may further be arranged on the touch panel.

Figure 4:
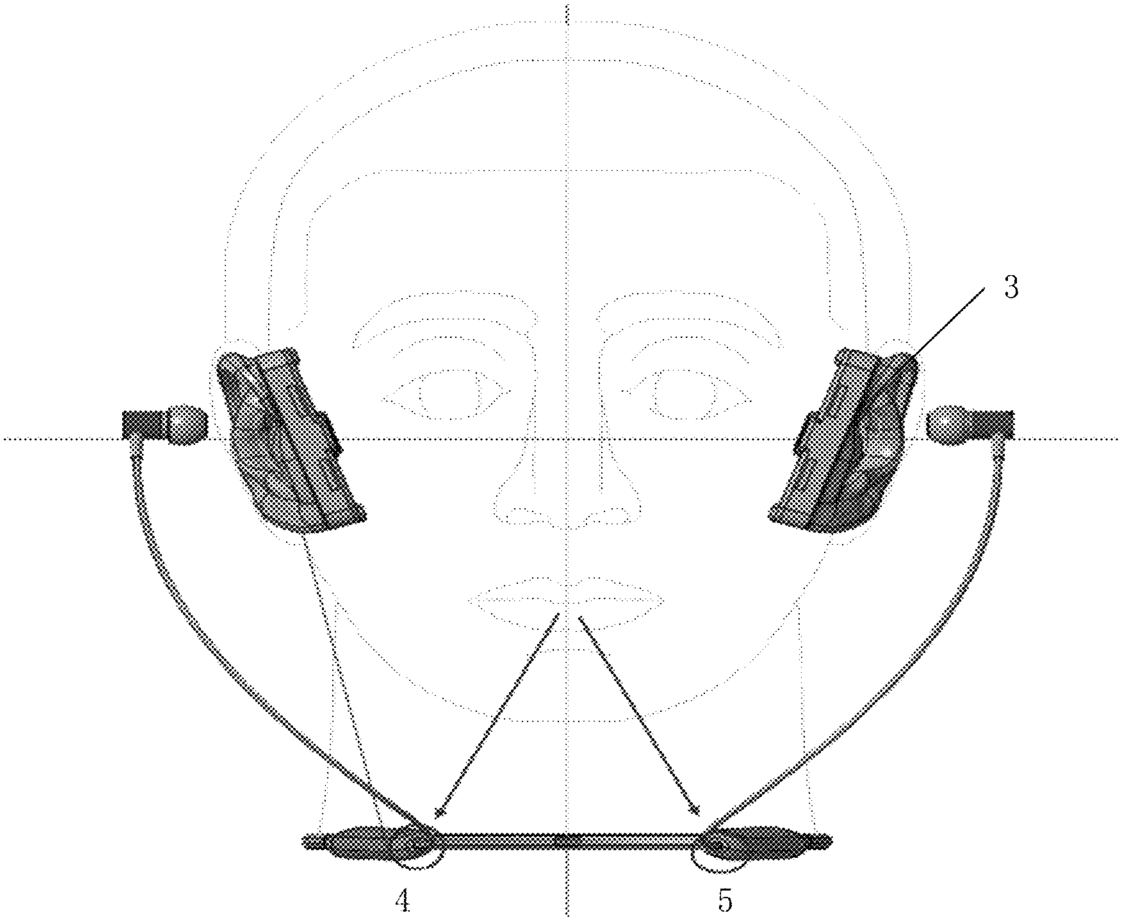
FIG. 4 is a schematic diagram showing a position of a microphone of a neckband earphone according to an embodiment of the present disclosure.

Reference is made to FIG. 4, which is a schematic diagram showing positions of microphones of a neckband earphone according to an embodiment of the present disclosure. In FIG. 4, reference signs 4 and 5 represent positions of microphones when the neckband earphone is worn in the predefined orientation or in the reverse orientation, and reference sign 3 represents a simulation structure of a human ear.

A relative position of the microphone of the neckband earphone to the user mouth when the neckband earphone is worn in the predefined orientation may be different from that when the neckband earphone is worn in the reverse orientation, which may result in different communication qualities when the user uses a communication function of the neckband earphone. For example, if the microphone is close to the user mouth, a voice signal acquired by the microphone is clear, and if the microphone is far away from the user mouth, a voice signal acquired by the microphone is indistinct. Therefore, in a neckband earphone according to an embodiment of the present disclosure, in order to ensure the communication quality of the neckband earphone in different wearing orientations, the position of the microphone arranged in the neckband earphone may be designed so that an acoustic relative position of the microphone of the neckband earphone is constant for different wearing orientations. For example, the microphone may be arranged on an inner side or an outer side of the neckband earphone, or an outside side of the touch panel.

Figure 5:
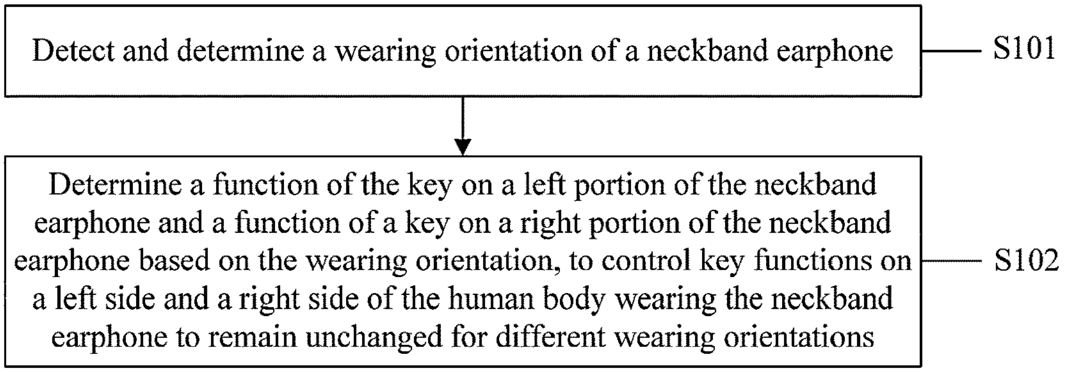
FIG. 5 is a flow chart of a method for switching functions of a neckband earphone according to a first embodiment of the present disclosure.

Reference is made to FIG. 5, which is a flow chart of a method for switching functions of a neckband earphone according to a first embodiment of the present disclosure.

A method for switching functions of a neckband earphone is provided according to an embodiment of the present disclosure. The method is applied to a neckband earphone. The method may include the following steps S101 and S102.

In step S101, a wearing orientation of the neckband earphone is detected and determined.

In step S102, a function of a key on a left portion of the neckband earphone and a function of a key on a right portion of the neckband earphone are determined based on the wearing orientation, to control key functions on a left side and a right side of a human body wearing the neckband earphone to remain unchanged for different wearing orientations.

In the method for switching functions of a neckband earphone according to the present disclosure, a key is provided on each of a left portion and a right portion of a neckband of the neckband earphone, the wearing orientation of the neckband earphone may be acquired, the function of the key on the left portion and the function of the key on the right portion are determined based on the wearing orientation, to control key functions on a left side and a right side of the human body wearing the neckband earphone to remain unchanged for different wearing orientations. Therefore, for the left side of the human body and the right side of the human body the functions of the neckband earphone remain unchanged no matter whether the user wears the neckband earphone in a predefined orientation or in a reverse orientation, so that the user does not need to determine the wearing orientation of the neckband earphone.

In a method for switching functions of a neckband earphone according to the present disclosure, the wearing orientation can be automatically determined only by changing the processing flow of the neckband earphone, without changing the structure of the neckband earphone according to the conventional technology. For example, sound information indicating the wearing orientation may be transmitted by a microphone of the neckband earphone and received to acquire the wearing orientation of the neckband earphone.

That is, the user can change the wearing orientation of the neckband earphone via voice.

In practices, touch information indicating the wearing orientation may be transmitted by the key of the neckband earphone and received to obtain the wearing orientation of the neckband earphone. That is, the user can change the wearing orientation of the neckband earphone by touching.

Figure 6:
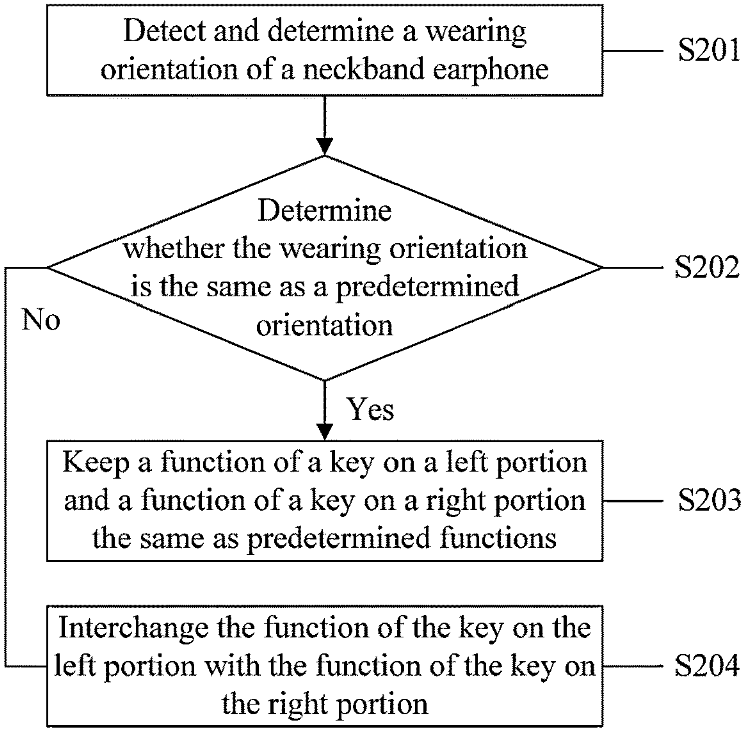
FIG. 6 is a flow chart of a method for switching functions of a neckband earphone according to a second embodiment of the present disclosure.

Reference is made to FIG. 6, which is a flow chart of a method for switching functions of a neckband earphone according to a second embodiment of the present disclosure.

A method for switching functions of a neckband earphone is provided according to an embodiment of the present disclosure. The method is applied to a neckband earphone. The method may include the following steps S201 to S204.

In step S201, a wearing orientation of the neckband earphone is detected and determined.

In step S202, it is determined whether the wearing orientation is the same as a predetermined orientation. If the wearing orientation is the same as the predetermined orientation, step S203 is performed. If the wearing orientation is opposite to the predetermined orientation, step S204 is performed.

In step S203, a function of a key on a left portion and a function of a key on a right portion are kept the same as predetermined functions.

In step S204, the function of the key on the left portion is interchanged with the function of the key on the right portion.

That is, in the method for switching functions of a neckband earphone according to the embodiment of the present disclosure, a predetermined orientation may be determined, and a predetermined function of a key is determined for the predetermined orientation. The predetermined orientation is a predetermined orientation for wearing the neckband earphone. For example, a predefined wearing orientation is determined as the predetermined orientation. The predetermined function is a predetermined key function. For example, a key on the left portion is determined as a playing side and a key on the right portion is determined as a function side. In this way, after the wearing orientation of the neckband earphone is acquired, the acquired wearing orientation may be compared with the predetermined orientation, and then a key function on the left portion and a key function on the right portion are determined according to the predetermined function. For example, the predetermined orientation is the predefined wearing orientation, and the predetermined function is determined as that the key on the left portion is the playing side and the key on the right portion is the function side. If the acquired wearing orientation is the predefined wearing orientation, the key function on the left portion and the key function on the right portion are controlled to be consistent with the predetermined function. If the acquired wearing orientation is the reverse wearing orientation, the function of the key on the left portion is interchanged with the function of the key on the right portion, that is, the key function on the left portion and the key function on the right portion are controlled to be contrary to the predetermined function. It should be noted that in practices, the predetermined functions of the neckband earphone may be configured according to user requirements.

Figure 7:
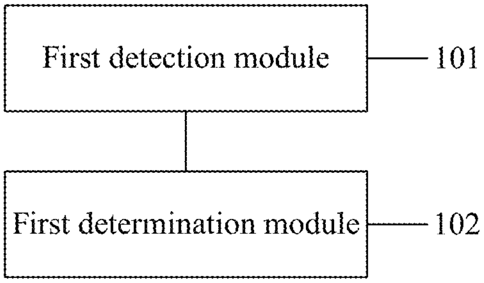
FIG. 7 is a schematic structural diagram of a system for switching functions of a neckband earphone according to an embodiment of the present disclosure.

Reference is made to FIG. 7, which is a schematic structural diagram showing a system for switching functions of a neckband earphone according to an embodiment of the present disclosure.

A system for switching functions of a neckband earphone is provided according to the embodiment of the present disclosure. The system is applied to a neckband earphone. The system may include a first detection module 101 and a first determination module 102. The first detection module 101 is configured to detect and determine a wearing orientation of the neckband earphone. The first determination module 102 is configured to determine a function of a key on a left portion of the neckband earphone and a function of a key on a right portion of the neckband earphone based on the wearing orientation, to control key functions on a left side and a right side of a human body wearing the neckband earphone to remain unchanged for different wearing orientations.

For description of each module in the system for switching functions of a neckband earphone according to the embodiment of the present disclosure, reference is made to the embodiments described above, which is not repeated herein.

Figure 8:
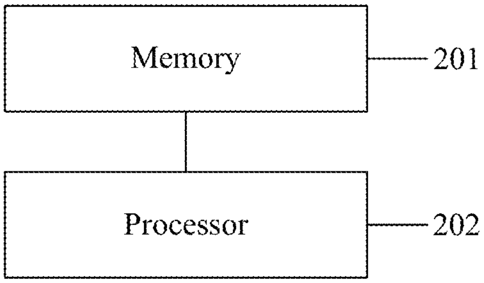
FIG. 8 is a schematic structural diagram of a device for switching functions of a neckband earphone according to an embodiment of the present disclosure.

A device for switching functions of a neckband earphone and a computer-readable storage medium are further provided according to the present disclosure. The device and the computer-readable storage medium have the same advantages as the method for switching functions of a neckband earphone according to the embodiments of the present disclosure. Reference is made to FIG. 8, which is a schematic structural diagram showing a device for switching functions of a neckband earphone according to an embodiment of the present disclosure.

A device for switching functions of a neckband earphone according to an embodiment of the present disclosure includes a memory 201 and a processor 202. The memory 201 stores a computer program. The processor 202, when executing the computer program, performs the following steps: detecting and determining a wearing orientation of the neckband earphone; and determining a function of a key on a left portion of the neckband earphone and a function of the key on the right portion of the neckband earphone based on the wearing orientation, to control key functions on a left side and a right side of a human body wearing the neckband earphone to remain unchanged for different wearing orientations.

A device for switching functions of a neckband earphone according to an embodiment of the present disclosure includes the memory 201 and the processor 202. The memory 201 stores the computer program. The processor 202, when executing the computer program, performs the following steps: receiving sound information indicating the wearing orientation and transmitted by a microphone of the neckband earphone.

A device for switching functions of a neckband earphone according to an embodiment of the present disclosure includes the memory 201 and the processor 202. The memory 201 stores the computer program. The processor 202, when executing the computer program, performs the following steps: receiving touch information indicating the wearing orientation and transmitted by the key of the neckband earphone.

A device for switching functions of a neckband earphone according to an embodiment of the present disclosure includes the memory 201 and the processor 202. The memory 201 stores the computer program. The processor 202, when executing the computer program, performs the following steps: determining whether the wearing orientation is the same as a predetermined orientation, keeping, if the wearing orientation is the same as the predetermined orientation, the function of the key on the left portion and the function of the key on the right portion the same as predetermined functions, and interchanging, if the wearing orientation is opposite to the predetermined orientation, the function of the key on the left portion with the function of the key on the right portion.

Figure 9:
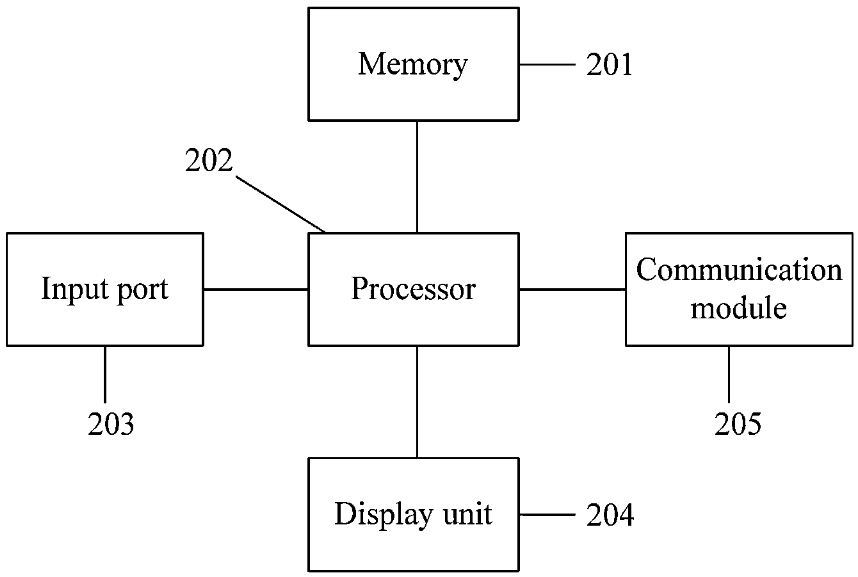
FIG. 9 is a schematic structural diagram of a device for switching functions of a neckband earphone according to another embodiment of the present disclosure.

Referring to FIG. 9, a device for switching functions of a neckband earphone according to another embodiment of the present disclosure may further include an input port 203, a display unit 204 and a communication module 205. The input port 203 is connected with the processor 202. The input port 203 is configured to transmit a command from outside of the device to the processor 202. The display unit 204 is connected with the processor 202. The display unit 204 is configured to display a processing result of the processor 202 to the outside of the device. The communication module 205 is connected with the processor 202. The communication module 205 is configured to communicate between the device for switching functions of a neckband earphone and the outside of the device. The display unit 204 may be a display panel, a laser scanning display, or the like. Communication means adopted by the communication module 205 include but are not limited to the mobile high-definition link (HML) technology, a universal serial bus (USB), a high-definition multimedia interface (HDMI), a wireless connection, the wireless fidelity technology (WiFi), the Bluetooth communication technology, the low-power Bluetooth communication technology, and a communication technology based on IEEE802.11s.

A computer-readable storage medium is provided according to an embodiment of the present disclosure. The computer-readable storage medium stores a computer program. The computer program, when being executed by a processor, performs the following steps: detecting and determining a wearing orientation of the neckband earphone; and determining a function of a key on a left portion of the neckband earphone and a function of the key on the right portion of the neckband earphone based on the wearing orientation, to control key functions on a left side and a right side of a human body wearing the neckband earphone to remain unchanged for different wearing orientations.

A computer-readable storage medium is provided according to an embodiment of the present disclosure. The computer-readable storage medium stores a computer program. The computer program, when being executed by a processor, performs the following steps: receiving sound information indicating the wearing orientation and transmitted by a microphone of the neckband earphone.

A computer-readable storage medium is provided according to an embodiment of the present disclosure. The computer-readable storage medium stores a computer program. The computer program, when being executed by a processor, performs the following steps: receiving touch information indicating the wearing orientation and transmitted by the key of the neckband earphone.

A computer-readable storage medium is provided according to an embodiment of the present disclosure. The computer-readable storage medium stores a computer program. The computer program, when being executed by a processor, performs the following steps: determining whether the wearing orientation is the same as a predetermined orientation, keeping, if the wearing orientation is the same as the predetermined orientation, the function of the key on the left portion and the function of the key on the right portion the same as predetermined functions, and interchanging, if the wearing orientation is opposite to the predetermined orientation, the function of the key on the left portion with the function of the key on the right portion.

The computer-readable storage medium according to the present disclosure includes a random-access memory (RAM), an internal memory, a read-only memory (ROM), an electrically programmable ROM, an electrically erasable programmable ROM, a register, a hard disk, a removable disk, a CD-ROM, or any one of other storage media that are known in this technical field.

For description of a related part of the method, the system and the device for switching functions of a neckband earphone, and the computer-readable storage medium according to the embodiments of the present disclosure, reference is made to the detailed description of the neckband earphone according to the embodiment of the present disclosure, which is not repeated herein. In addition, the part of the above technical solution according to the embodiments of the present disclosure that is consistent with the technical solution in the conventional technology is not described in detail to avoid redundancy.

It should be further noted that the relationship terminologies such as first, second or the like are only used in the present disclosure to distinguish one entity or operation from another entity or operation, rather than to necessitate or imply that the actual relationship or order exists between the entities or operations. Furthermore, terms of "include", "comprise" or any other variants are intended to be non-exclusive. Therefore, a process, method, article or device including a series of elements includes not only the elements but also other elements that are not enumerated, or also includes the elements inherent to the process, method, article or device. Unless expressively limited otherwise, the statement "comprising (including) a . . . " does not exclude the case that other similar elements may exist in the process, method, article or device.

Embodiments of the disclosure are described above, so that those skilled in the art can implement or use the present disclosure. Various modifications to the embodiments are apparent to those skilled in the art, and general principles defined in this specification may be implemented in other embodiments without departing from the spirit or scope of the present disclosure. Therefore, the present disclosure is not limited to the embodiments described in this specification, but accords with the widest scope consistent with the principles and novel features disclosed in this specification.

The invention claimed is:

1. A method for switching functions of a neckband earphone, comprising:

detecting and determining a wearing orientation of the neckband earphone; and determining a function of a key on a left portion of the neckband earphone and a function of a key on a right portion of the neckband earphone based on the wearing orientation, to control key functions on a left side and a right side of the a human body wearing the neckband earphone to remain unchanged for different wearing orientations, wherein the determining the function of the key on the left portion and the function of the key on the right portion based on the wearing orientation comprises:

determining whether the wearing orientation is the same as a predetermined orientation;

keeping, if the wearing orientation is the same as the predetermined orientation, the function of the key on the left portion and the function of the key on the right portion the same as predetermined functions; and interchanging, if the wearing orientation is opposite to the predetermined orientation, the function of the key on the left portion with the function of the key on the right portion.

2. A system for switching functions of a neckband earphone, wherein the method for switching functions of the neckband earphone according to claim 1 is applied to the system for switching functions of the neckband earphone.

3. A device for switching functions of a neckband earphone, comprising:

a memory, configured to store a computer program; and a processor, configured to, when executing the computer program, perform the method for switching functions of a neckband earphone according to claim 1.

4. A non-transitory computer-readable storage medium, storing a computer program, wherein the computer program is used to, when being executed by a processor, perform the method for switching functions of a neckband earphone according to claim 1.

* * * * *